(12) United States Patent
Yoneyama et al.

(10) Patent No.: US 10,245,869 B2
(45) Date of Patent: Apr. 2, 2019

(54) THERMAL TRANSFER SHEET, METHOD FOR PRODUCING THERMAL TRANSFER SHEET, THERMAL TRANSFER IMAGE-RECEIVING SHEET, METHOD FOR PRODUCING THERMAL TRANSFER IMAGE-RECEIVING SHEET, METHOD FOR FORMING PRINTED PRODUCT, AND PRINTED PRODUCT

(71) Applicant: Dai Nippon Printing Co., Ltd., Tokyo (JP)

(72) Inventors: Yasushi Yoneyama, Tokyo (JP); Hiroyuki Yamashita, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/566,304

(22) PCT Filed: Apr. 15, 2016

(86) PCT No.: PCT/JP2016/062126
§ 371 (c)(1),
(2) Date: Oct. 13, 2017

(87) PCT Pub. No.: WO2016/167352
PCT Pub. Date: Oct. 20, 2016

(65) Prior Publication Data
US 2018/0117941 A1     May 3, 2018

(30) Foreign Application Priority Data
Apr. 15, 2015  (JP) .................. 2015-083547

(51) Int. Cl.
*B41M 5/382*     (2006.01)
*B41M 5/50*      (2006.01)
(Continued)

(52) U.S. Cl.
CPC ........ *B41M 5/38221* (2013.01); *B41M 5/345* (2013.01); *B41M 5/382* (2013.01);
(Continued)

(58) Field of Classification Search
CPC ........ B41M 5/34; B41M 5/345; B41M 5/382; B41M 5/40; B41M 5/42; B41M 5/50;
(Continued)

(56) References Cited

U.S. PATENT DOCUMENTS

| | | | |
|---|---|---|---|
| 4,923,848 A | 5/1990 | Akada et al. | |
| 5,576,264 A | 11/1996 | Ueno et al. | |
| 6,316,385 B1 | 11/2001 | Usuki et al. | |

FOREIGN PATENT DOCUMENTS

| | | |
|---|---|---|
| EP | 1 344 653 A1 | 9/2003 |
| JP | S62-238791 A1 | 10/1987 |

(Continued)

OTHER PUBLICATIONS

International Search Report and Written Opinion (Application No. PCT/JP2016/062126) dated Jun. 21, 2016.

*Primary Examiner* — Bruce H Hess
(74) *Attorney, Agent, or Firm* — Burr & Brown, PLLC

(57) ABSTRACT

In a thermal transfer sheet in which a transfer layer is provided on a substrate, the transfer layer has a layered structure in which a receiving layer, an intermediate layer, and a masking layer are layered in this order from the side of the substrate, the receiving layer is a solvent-based receiving layer containing a solvent-based resin and a silicone oil, the intermediate layer is a water-based intermediate layer containing a water-based resin, and the masking layer is a solvent-based masking layer containing a solvent-based resin and a colorant.

2 Claims, 3 Drawing Sheets

(51) Int. Cl.
*B41M 5/52* (2006.01)
*B41M 5/34* (2006.01)
*B41M 5/41* (2006.01)
B32B 27/36 (2006.01)

(52) U.S. Cl.
CPC ............... *B41M 5/41* (2013.01); *B41M 5/50* (2013.01); *B41M 5/52* (2013.01); *B41M 5/5218* (2013.01); *B41M 5/5263* (2013.01); *B32B 27/365* (2013.01); *B41M 5/506* (2013.01)

(58) Field of Classification Search
CPC .. B41M 5/502; B41M 5/506; B41M 2205/04; B41M 2205/38; B41M 2205/40
USPC .................... 428/32.39, 32.51, 32.52, 32.69, 428/32.75–32.77
See application file for complete search history.

(56) References Cited

FOREIGN PATENT DOCUMENTS

| | | |
|---|---|---|
| JP | H05-050774 A1 | 3/1993 |
| JP | H06-122281 A1 | 5/1994 |
| JP | H07-144480 A1 | 6/1995 |

THERMALLY TRANSFERABLE IMAGE

THERMAL TRANSFER SHEET, METHOD FOR PRODUCING THERMAL TRANSFER SHEET, THERMAL TRANSFER IMAGE-RECEIVING SHEET, METHOD FOR PRODUCING THERMAL TRANSFER IMAGE-RECEIVING SHEET, METHOD FOR FORMING PRINTED PRODUCT, AND PRINTED PRODUCT

BACKGROUND OF THE INVENTION

1. Field of the Invention

The present invention relates a thermal transfer sheet, a method for producing thermal transfer sheet, a thermal transfer image-receiving sheet, a method for producing thermal transfer image-receiving sheet, a method for forming a printed product, and a printed product.

2. Description of Related Art

As a device for forming a printed product on a transfer receiving article without restriction, an intermediate transfer medium in which a transfer layer including a receiving layer is peelably provided on a substrate has been used (for example, Patent Literature 1). According to this intermediate transfer medium, a printed product where a thermally transferable image has been formed on an optional transfer receiving article can be obtained by forming the thermally transferable image on the receiving layer of the intermediate transfer medium by means of a thermal transfer sheet having a colorant layer, and then transferring the transfer layer including this receiving layer onto the optional transfer receiving article.

Incidentally, some optional transfer receiving articles may have a hologram image or thermally transferable image (hereinbelow, such hologram images or thermally transferable images are collectively referred to as patterns of the transfer receiving article) on their surface in advance. In the case where the transfer layer of the above intermediate transfer medium is transferred onto this transfer receiving article, a pattern formed on the receiving layer constituting the transfer layer transferred onto the transfer receiving article is superposed on the pattern of the transfer receiving article to thereby form an overlay image. Depending on the form of usage of the printed product, there is a demand to obtain, not such an overlay image, a printed product in which the pattern of the transfer receiving article is masked while a thermally transferable image is formed on the masked portion. Under these circumstances, there has been proposed a thermal transfer sheet in which a portion of the pattern of the transfer receiving article is masked while a thermally transferable image can be formed on the pattern masked (for example, Patent Literature 2).

The thermal transfer sheet proposed in Patent Literature 2 is provided with a transfer layer in which a transparent receiving layer (hereinbelow, the layer is referred to as the receiving layer) and a white masking layer (hereinbelow, the layer is referred to as the masking layer) are layered in this order on a substrate. By transferring the transfer layer onto a portion of the transfer receiving article, it is possible to obtain a thermal transfer image-receiving sheet which masks the pattern of the transfer receiving article while enabling formation of a thermally transferable image on the masked portion. Then, by forming a thermally transferable image on the transparent receiving layer of the thermal transfer image-receiving sheet obtained, it is possible to obtain a printed product in which an optional pattern of the transfer receiving article is masked while the thermally transferable image is formed on the masked portion.

CITATION LIST

Patent Literature

Patent Literature 1: Japanese Patent Laid-Open No. 62-238791 A
Patent Literature 2: Japanese Patent Laid-Open No. 6-122281 A

SUMMARY OF THE INVENTION

In the above Patent Literature 2, a thermal transfer sheet in which a receiving layer and a masking layer are layered in this order on a substrate is formed by coating the substrate with a coating liquid containing a vinyl chloride-vinyl acetate copolymer resin as a solvent-based resin, an amino-modified silicone as a release agent, and an organic solvent and a coating liquid containing a vinyl chloride-vinyl acetate copolymer resin as a solvent-based resin, titanium oxide as a colorant, and an organic solvent. However, in this forming method, both the coating liquid for forming the receiving layer and the coating liquid for forming the masking layer contain a solvent-based resin soluble in a solvent and an organic solvent. Thus, when the receiving layer is formed on the substrate and then the masking layer is formed on the receiving layer in the stage of forming the thermal transfer sheet, the release agent contained in the receiving layer is eluted into the masking layer side. In the case where the release agent contained in the receiving layer is eluted into the masking layer side, the amount of the release agent contained in the receiving layer decreases accordingly. Along with this, the releasability of the receiving layer will be reduced. As a result, when a sublimable dye contained in the dye layer is allowed to diffuse and transfer onto the receiving layer of the thermal transfer image-receiving sheet obtained by transferring the transfer layer to thereby form a thermally transferable image, a problem of thermal fusion between the receiving layer and the dye layer and the like may be caused.

Against the above problems, it is considered that the releasability of the receiving layer can be satisfied by taking measures to increase the amount of the release agent contained in the coating liquid for forming the receiving layer in consideration of elution of the release agent contained in the receiving layer into the masking layer side in advance. However, when the amount of the release agent contained in the coating liquid for forming the receiving layer is increased, the amount of the release agent contained in the transfer layer will be increased accordingly. Release agents have an advantage of satisfying the releasability whereas having a property of being likely to decrease the adhesion of the layer containing the release agent. Thus, with the above measures, it is not possible to satisfy the adhesion between the substrate and the receiving layer and the adhesion between the receiving layer and the masking layer, even if the releasability of the receiving layer can be satisfied.

The present invention has been made in view of the above-mentioned circumstances, and the present invention aims principally to provide a thermal transfer image-receiving sheet having a good releasability from a dye layer when a thermally transferable image is formed and a thermal transfer sheet for obtaining this thermal transfer image-receiving sheet, to provide a method for producing the thermal transfer sheet or the thermal transfer image-receiving sheet exerting this effect, and to provide a printed product formed by using this thermal transfer image-receiving sheet and a method for forming a printed product by using these thermal transfer sheet and thermal transfer image-receiving sheet.

Solution to Problem

The present invention for solving the above problems is a thermal transfer sheet comprising a transfer layer provided on a substrate, the transfer layer having a layered structure of a receiving layer, an intermediate layer, and a masking layer layered in this order from the side of the substrate, the receiving layer being a solvent-based receiving layer containing a solvent-based resin and a silicone oil, the intermediate layer being a water-based intermediate layer containing a water-based resin, and the masking layer being a solvent-based masking layer containing a solvent-based resin and a colorant.

In the thermal transfer sheet described above, the glass-transition temperature (Tg) of the water-based resin contained in the water-based intermediate layer may be 110° C. or less.

The present invention for solving the above problems is also a method for producing a thermal transfer sheet, comprising forming a transfer layer on a substrate; wherein forming the transfer layer comprises coating the substrate with a coating liquid for a receiving layer containing a solvent-based resin, a silicone oil, and an organic solvent to form a receiving layer, coating the receiving layer with a coating liquid for an intermediate layer containing a water-based resin and a water-based solvent to form an intermediate layer, and coating the intermediate layer with a coating liquid for a masking layer containing a solvent-based resin, a colorant, and an organic solvent to form a masking layer.

The present invention for solving the above problems is also a thermal transfer image-receiving sheet comprising a pattern layer, a masking layer, an intermediate layer, and a receiving layer provided in this order on a substrate, a portion of the surface of the pattern layer being exposed, the receiving layer being a solvent-based receiving layer containing a solvent-based resin and a silicone oil, the intermediate layer being a water-based intermediate layer containing a water-based resin, and the masking layer being a solvent-based masking layer containing a solvent-based resin and a colorant.

In the thermal transfer image-receiving sheet described above, the glass-transition temperature (Tg) of the water-based resin contained in the water-based intermediate layer may be 110° C. or less.

The present invention for solving the above problems is also a method for producing a thermal transfer image-receiving sheet comprising transferring a transfer layer of a thermal transfer sheet onto a pattern layer possessed by a transfer receiving article so as to leave a portion of the surface of the pattern layer bare, and the thermal transfer sheet being the thermal transfer sheet described above.

The present invention for solving the above problems is also a printed product comprising a thermally transferable image formed on the receiving layer of the thermal transfer image-receiving sheet described above.

The present invention for solving the above problems is also a method for producing a thermal transfer image-receiving sheet comprising transferring a transfer layer of a thermal transfer sheet onto a pattern layer possessed by a transfer receiving article so as to leave a portion of the surface of the pattern layer bare, and the thermal transfer sheet being the thermal transfer sheet described above.

The present invention for solving the above problems is also a method for forming a printed product, comprising a step of transferring the transfer layer of a thermal transfer sheet onto the pattern layer possessed by a transfer receiving article such that a portion of the surface of the pattern layer is exposed and a step of forming a thermally transferable image on the transfer layer transferred on the pattern layer, wherein the thermal transfer sheet used in the transferring step is the thermal transfer sheet described above.

Advantageous Effects of Invention

According to the thermal transfer image-receiving sheet and the method for forming a printed product of the present invention, it is possible to make the releasability from the dye layer when a thermally transferable image is formed satisfactory. According to the thermal transfer sheet of the present invention, it is also possible to obtain a thermal transfer image-receiving sheet having the effects described above. According to the method for producing a thermal transfer sheet or a thermal transfer image-receiving sheet of the present invention, it is also possible to produce a thermal transfer sheet and a thermal transfer image-receiving sheet exerting the effects described above. According to the printed product of the present invention, it is also possible to increase the designability of the printed product of the present invention.

DETAILED DESCRIPTION OF THE INVENTION

Figure 1:
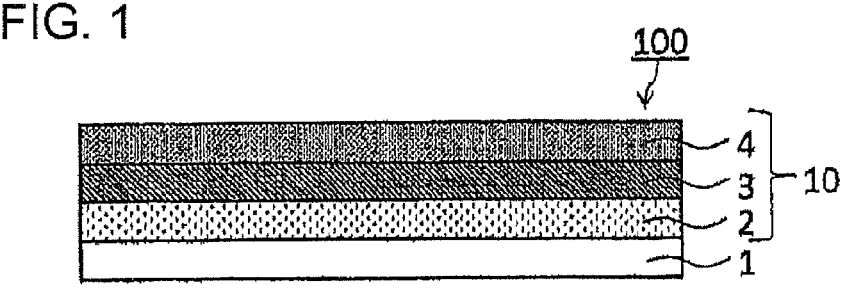
FIG. 1 is a schematic sectional view illustrating one example of a thermal transfer sheet of one embodiment.

<<Thermal Transfer Sheet>> thermal transfer sheet 100 of one embodiment of the present invention (hereinbelow, the sheet is referred to as the thermal transfer sheet of one embodiment) has a transfer layer 10 provided on a substrate 1, and the transfer layer 10 has a layered structure in which a receiving layer 2, an intermediate layer 3, and a masking layer 4 are layered in this order from the side of the substrate 1, as shown in FIG. 1.

Figure 4:
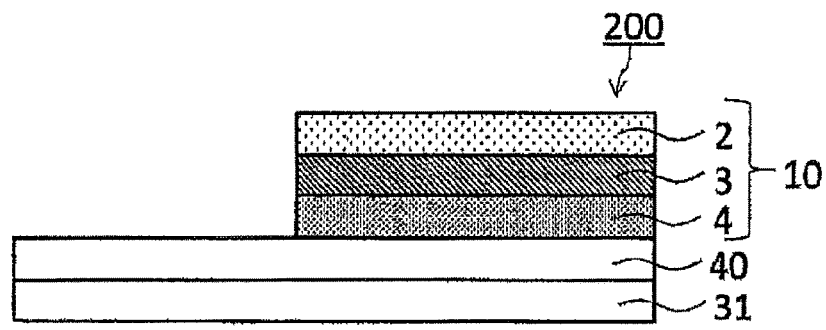
FIG. 4 is a schematic sectional view illustrating one example of a thermal transfer image-receiving sheet of one embodiment.

The thermal transfer sheet 100 of one embodiment is a thermal transfer sheet used for obtaining a thermal transfer image-receiving sheet 200 as shown in FIG. 4, for example. Specifically, by transferring the transfer layer 10 of the thermal transfer sheet 100 onto an optional transfer receiving article (hereinbelow, the article is referred to as a transfer receiving article) such that a portion of the surface on the transfer receiving article is exposed, a thermal transfer image-receiving sheet in which the transfer layer 10 is provided on the transfer receiving article is obtained. Specifically, a thermal transfer image-receiving sheet 200 in which the masking layer 4, the intermediate layer 3, and the receiving layer 2 are layered in this order on the transfer receiving article is obtained by allowing a portion of the surface of the transfer receiving article to be exposed. Next, the respective constituents which constitute the thermal transfer sheet 100 will be specifically explained.

(Substrate)

The substrate 1 is an essential constituent in the thermal transfer sheet 100 of one embodiment, and it is provided in order to support the transfer layer 10 provided on one surface of the substrate 1 and a back face layer optionally provided on the other surface of the substrate 1. There is no particular limitation with respect to the material of the substrate 1, but the material desirably endures the heat applied when the transfer layer 10 is transferred onto the transfer receiving article and has a mechanical strength to the extent of being able to handle without a hitch. As the substrate 1 like this, various plastic films or sheets such as polyesters such as polyethylene terephthalate, polycarbonate, polyimide, polyether imide, cellulose derivatives, polyethylene, polypropylene, polystyrene, acryl, polyvinyl chloride, polyvinylidene chloride, nylon, polyether ether ketone, and the like can be exemplified. The thickness of the substrate 1 can be appropriately set depend on the materials such that the strength and heat resistance will be suitable. The thickness is generally in the range of 2.5 μm or more and 100 μm or less.

(Transfer Layer)

The transfer layer 10 is provided on the substrate 1 and has a layered structure in which the receiving layer 2, the intermediate layer 3, and the masking layer 4 are layered in this order from the side of the substrate 1. The transfer layer 10 is provided peelably from the substrate 1 and is a layer to be transferred onto a transfer receiving article when thermally transferred.

(Masking Layer)

The masking layer 4, constituting the transfer layer 10, is a layer exerting a function of masking a portion of the surface of a transfer receiving article onto which the transfer layer 10 has been transferred. The masking layer 4 contains a solvent-based resin and a colorant as essential components. According to the thermal transfer sheet 100 of one embodiment comprising a masking layer 4 containing a solvent-based resin, it is possible to make an improvement in the masking property when the transfer layer 10 is transferred, compared with a thermal transfer sheet comprising a masking layer containing no solvent-based resin, that is, containing a water-based resin.

The "solvent-based resin" referred to herein means a resin which can be dissolved or dispersed in an organic solvent. As the solvent-based resin contained in the masking layer 4, urethane resins, polyolefin-based resins, halogenated resins such as polyvinyl chloride and polyvinylidene chloride, polyvinyl acetate, vinyl chloride-vinyl acetate copolymers, ethylene-vinyl acetate copolymers, polyvinyl butyral, polyester resins, polystyrene-based resins, polyamide-based resins, cellulose-based resins, polycarbonate, acrylic-based resins, and the like can be exemplified.

Among resins which can be dissolved or dispersed in an organic solvent, there exist resins which can also be dissolved or dispersed in a water-based solvent (hereinafter, a resin which can be dissolved or dispersed both in an organic solvent and a water-based solvent is referred to as an "amphoteric resin".). When a masking layer 4 containing an "amphoteric resin" is used, it is provided that the masking layer 4 is a masking layer 4 formed by using a coating liquid prepared by dispersing or dissolving an "amphoteric resin" in an organic solvent. Identification of the type of the solvent remaining in the masking layer makes it possible to distinguish whether the masking layer 4 is one formed by using a coating liquid prepared by dispersing or dissolving an "amphoteric resin" in an organic solvent or one formed by using a coating liquid prepared by dispersing or dissolving an "amphoteric resin" in a water-based solvent. The type of the solvent can be identified by, for example, the gas chromatography method, or by using an infrared moisture analyzer or a heat-drying moisture analyzer. The same applies to a "solvent-based resin" contained in the receiving layer 2 described later.

As the organic solvent for dissolving or dispersing a solvent-based resin, hydrocarbon-based solvents such as hexane and pentane, aromatic type solvents such as xylene, toluene, and benzene, ketone type solvents such as methyl ethyl ketone and acetone, alcohol type solvents such as propanol, ethanol, and methanol or mixed solvents of these, and the like can be exemplified.

As the colorant, known colorants such as titanium oxide, zinc oxide, carbon black, iron oxide, yellow iron oxide, ultramarine, metallic pigments, pearl pigments, and the like can be exemplified.

The masking layer 4 may contain one solvent-based resin solely or may contain two or more solvent-based resins. The same applies to the colorant.

There is no particular limitation with respect to the content of the colorant and the solvent-based resin, and the content may be appropriately determined depending on the type of the colorant and the solvent-based resin. An example of the content of the colorant when the total mass of the solvent-based resin is taken as 100% by mass is in the range of 50% by mass or more and 600% by mass or less.

There is no particular limitation with respect to the method for forming the masking layer 4, and the masking layer 4 may be formed by dissolving or dispersing the solvent-based resin exemplified as above, a colorant, and optionally, additives if necessary in an appropriate organic solvent to prepare a coating liquid for the masking layer, coating the intermediate layer 3 described later with the thus prepared coating liquid using a conventionally known forming device such as the gravure coating method, the roll coat method, the screen printing method, the reverse roll coating method using a gravure plate, or the like, and then drying the coating liquid.

There is no particular limitation with respect to the thickness of the masking layer 4, and the thickness may be appropriately set in consideration of the masking property by the masking layer 4. When the thickness of the masking layer 4 is less than 0.1 μm, the masking property tends to decrease. Considering this point, the thickness of the masking layer 4 is preferably 0.1 μm or more. The preferable upper value of the masking layer is not particularly limited, and it may be of the order of 5 μm.

(Receiving Layer)

The receiving layer 2, which constitutes the transfer layer 10, is a layer located nearest the substrate 1 of the layers constituting the transfer layer 10. In the thermal transfer sheet 100 of one embodiment the receiving layer 2 contains a solvent-based resin and a silicone oil as essential components.

There is no particular limitation with respect to the solvent-based resin contained in the receiving layer 2, and the solvent-based resin described in the above masking layer 4 and the like can be appropriately selected and used. The receiving layer 2 may contain one solvent-based resin solely or may contain two or more solvent-based resins.

There is no particular limitation with respect to the content of the solvent-based resin based on the total mass of the receiving layer 2, and the content is preferably 50% by mass or more. The upper limit is not particularly limited and can be set as appropriate depending on the content of the silicone oil.

The silicone oil contained in the receiving layer 2 is a release agent intended to improve the releasability when the transfer layer 10 is transferred onto a transfer receiving article (the releasability may be referred to as transferability in some cases) and the releasability from a dye layer when a sublimable dye contained in a dye layer is allowed to diffuse and transfer onto the receiving layer 2 of the thermal transfer image-receiving sheet 200 obtained by transferring the transfer layer 10 onto a transfer receiving article (see FIGS. 4 and 5) to form a thermally transferable image on the receiving layer 2.

There is no particular limitation with respect to the silicone oil, and a conventionally known silicone oil can be appropriately selected and used. As the silicone oil, modified silicone oils prepared by introducing various functional groups into polysiloxanes may be used. Modified silicone oils are classified into reactive silicone oils and non-reactive silicone oils. As the reactive silicone oil, amino-modified, epoxy-modified, carboxy-modified, carbinol-modified, methacryl-modified, mercapto-modified, phenol-modified oils, and the like can be exemplified. As the non-reactive silicone oil, polyether-modified, methylstyryl-modified, alkyl-modified, higher aliphatic ester-modified, fluorine-modified oils, and the like can be exemplified.

The modified silicone oil may be any of side-chain type silicone oils formed by introducing various functional groups into some of the side chains of polysiloxane, dual-end type silicone oils formed by introducing various functional groups into both the ends of polysiloxane, one-end type silicone oils formed by introducing various functional groups into one end of the polysiloxane, and side chain dual-end type silicone oils formed by introducing various functional groups into some of the side chains and both the ends of polysiloxane.

The receiving layer 2 may contain one of silicone oils solely or may contain two or more of these.

The receiving layer 2 of an optimal embodiment contains an aralkyl-modified silicone oil as the silicone oil. According to the thermal transfer sheet of one embodiment comprising the receiving layer 2 containing aralkyl-modified silicone oil, it is possible to make a further improvement in the releasability from the dye layer when a sublimable dye contained in a dye layer is allowed to diffuse and transfer onto the receiving layer 2 of the thermal transfer image-receiving sheet 200 obtained by transferring the transfer layer 10 onto a transfer receiving article to form a thermally transferable image on the receiving layer 2. Combination of the aralkyl-modified silicone oil with other modified silicone oil can further improve the releasability from the dye layer and can also make an improvement in the releasability when the transfer layer 10 is transferred onto a transfer receiving article. As other modified silicone oil, polyether-modified silicone oils and the like can be exemplified.

There is no particular limitation with respect to the content of the silicone oil. In the case where the total mass of the silicone oil is 5% by mass or less based on the total mass of the receiving layer, the releasability when the transfer layer is transferred and the releasability from the dye layer when a thermally transferable image is formed tend to decrease. In contrast, with more than 30% by mass, the adhesion between the substrate 1 and the receiving layer 2 and the adhesion between the receiving layer 2 and the intermediate layer 3 tend to decrease due to the action of the silicone oil. Accordingly, considering this point, the total mass of the silicone oil based on the total mass of the receiving layer is preferably more than 5% by mass and 30% by mass or less, more preferably 6% by mass or more and less than 27% by mass, particularly preferably 10% by mass or more and 25% by mass or less.

The receiving layer 2 may contain other release agent as the release agent together with the silicone oil, which is the above essential component. As other release agent, solid waxes such as polyethylene wax, amide wax, and Teflon (R) powder, fluorine-based or phosphoric acid ester-based surfactants, and the like can be exemplified.

Although the details are described later, when the thermal transfer sheet 100 of one embodiment is used as the structure, it is possible to prevent elution of the silicone oil contained in the receiving layer 2 into the masking layer 4 side in the stage of forming the thermal transfer sheet 100. When a comparative thermal transfer sheet not satisfying the matters specifying the invention of the thermal transfer sheet 100 of one embodiment is used as the structure, the silicone oil contained in the receiving layer is eluted into the masking layer side in the stage of forming the comparative thermal transfer sheet. Thus, for example, in order to set the amount of the silicone oil contained in the receiving layer to the preferable amount contained described above, it is necessary to allow the coating liquid for forming the receiving layer to contain a large amount of the silicone oil in advance, in consideration of the amount of the silicone oil to be eluted into the masking layer side. Silicone oils have an advantage of having excellent releasability whereas having a property of being likely to decrease the adhesion of a layer containing a silicone oil. When the silicone oil is eluted into the masking layer side, a problem of decrease in the adhesion of the layer containing the eluted silicone oil.

There is no particular limitation with respect to the method for forming the receiving layer 2, and the receiving layer 2 may be formed by dispersing or dissolving the solvent-based resin and silicone oil exemplified as above, and optionally, additives if necessary in an appropriate organic solvent to prepare a coating liquid for the receiving layer, coating the substrate 1 with the thus prepared coating liquid using a conventionally known coating device such as the gravure coating method, the roll coat method, the screen printing method, the reverse roll coating method using a gravure plate, or the like, and then drying the coating liquid. There is no particular limitation with respect to the thickness of the receiving layer 2, and the thickness is usually in the range of 1 μm or more and 10 μm or less.

In the thermal transfer sheet 100 of one embodiment, a release layer (not shown) may be provided between the substrate 1 and the transfer layer 10. The release layer, which is an optional constituent in the thermal transfer sheet 100 of one embodiment, is a layer not constituting the transfer layer 10. In other words, the release layer is a layer not to be transferred onto the transfer receiving article when the transfer layer 10 is transferred onto the transfer receiving article.

(Intermediate Layer)

The intermediate layer 3 is provided between the receiving layer 2 and the masking layer 4 described above. The intermediate layer 3, which is a layer constituting the transfer layer 10 together with the receiving layer 2 and the masking layer 4, is an essential constituent in the thermal transfer sheet 100 of one embodiment.

The thermal transfer sheet 100 of one embodiment is characterized in that the intermediate layer 3 contains a water-based resin as an essential component. According to the thermal transfer sheet 100 of one embodiment having this characteristic, it is possible to prevent elution of the silicone oil contained in the receiving layer 2 into the masking layer 4 side and to maintain the releasability of the receiving layer 2 in the stage of forming the thermal transfer sheet 100 of one embodiment. Specifically, while both the receiving layer 2 located directly below the intermediate layer 3 and the masking layer 4 located directly on the intermediate layer 3 contain a solvent-based resin, the intermediate layer 3 disposed between the receiving layer 2 and the masking layer 4 contains a water-based resin. Accordingly, in the stage of forming the thermal transfer sheet 100 of one embodiment, the receiving layer 2 is not compatible with the intermediate layer 3 and the intermediate layer 3 is not compatible with the masking layer 4. Thus, it is possible to retain the silicone oil contained in the receiving layer 2 within the receiving layer 2. That is, the intermediate layer 3 serves a barrier layer that prevents elution of the silicone oil contained in the receiving layer 2 into the masking layer 4 side.

According to the structure of the thermal transfer sheet 100 of one embodiment, allowing the coating liquid for forming the receiving layer 2 to contain an appropriate amount of the silicone oil is sufficient without consideration of dissolution of the silicone oil in the stage of forming the thermal transfer sheet 100. As a result, while the releasability of the receiving layer is satisfied, it is possible to prevent the interlayer adhesion between each layer, specifically, the interlayer adhesion between the substrate 1 and the receiving layer 2, between the receiving layer 2 and the intermediate layer 3, and between the intermediate layer 3 and the masking layer 4, from decreasing. When a comparative thermal transfer sheet not satisfying the matters specifying the invention of the thermal transfer sheet 100 of one embodiment is used as the structure, for example, when the intermediate layer 3 is not provided or when an intermediate layer containing a solvent-based resin is disposed between the receiving layer 2 and the masking layer 4, it is necessary to allow the coating liquid for forming the receiving layer 2 to contain an excess of the silicone oil in the stage of forming this comparative thermal transfer sheet. In other words, it is necessary to increase the amount of the silicone oil to be contained in the coating liquid, in consideration of the amount of the silicone oil to be eluted into the masking layer side. In this case, the amount of the silicone oil contained in the entire transfer layer 10 increases, and the intermediate layer 3 and the masking layer 4 contain the silicone oil eluted from the receiving layer 2. Thus, the interlayer adhesion between each layer will be reduced.

That is, according to the thermal transfer sheet 100 of one embodiment, it is possible to make the releasability of the receiving layer 2 sufficient while easily preventing reduction in the interlayer adhesion.

The "water-based resin" referred to herein means a water-soluble resin or a resin which is not insoluble in water-based solvents but can be dispersed as emulsions and dispersions in water-based solvents. As the water-based solvent, water, mixed solvents of water and alcohol, and the like can be exemplified.

As the water-soluble resin, polyvinyl pyrrolidone resins, polyvinyl alcohol resins, polyacrylic acid, polyhydroxyethyl acrylate, water-soluble (or water-dispersed) polyester resins, water-soluble (or water-dispersed) polyurethane resins, water-dispersible vinyl chloride resins, water-dispersible acryloyl chloride-based resins, water-dispersible epoxy resins, gelatin, hydroxyethyl cellulose resins, hydroxypropyl cellulose resins, carboxymethyl cellulose, and the like can be exemplified.

When the "water-based resin" contained in the intermediate layer 3 is the "amphoteric resin" described above, it is provided that the intermediate layer 3 is an intermediate layer 3 formed by using a coating liquid prepared by dispersing or dissolving the "amphoteric resin" in the water-based resin. Identification of the type of the solvent remaining in the intermediate layer makes it possible to distinguish whether the intermediate layer is one formed by using a coating liquid prepared by dispersing or dissolving an "amphoteric resin" in a water-based solvent or one formed by using a coating liquid prepared by dispersing or dissolving an "amphoteric resin" in an organic solvent. The type of the solvent can be identified by, for example, the gas chromatography method, or by using an infrared moisture analyzer or a heat-drying moisture analyzer.

The intermediate layer 3 may contain one of water-based resins solely or may contain two or more of these.

The intermediate layer 3 of an optimal embodiment contains a water-based resin having a glass-transition temperature (Tg) of 120° C. or less, preferably 110° C. or less. According to the thermal transfer sheet 100 of one embodiment comprising the intermediate layer 3 of an optimal embodiment, it is possible to make an improvement in the foil tearing property of the transferable protective layer 10 including the intermediate layer 3. Incidentally, the glass-transition temperature (Tg) referred to herein means a temperature determined in compliance with JIS K7121: 2012 and based on measurement of a change of calorie (DSC method) in accordance with the DSC (differential scanning calorimetry).

The intermediate layer 3 may contain optional components together with the water-based resin described above. As the optional component, inorganic particles such as alumina, silica, titanium oxide, carbon black, and the like can be exemplified. Allowing the intermediate layer 3 to contain inorganic particles together with the water-based resin can further improve the foil cutting property of the transfer layer 10 including the intermediate layer 3. The intermediate layer 3 of a more optimal embodiment contains alumina particles and silica particles together with the water-based resin. Particularly, the intermediate layer 3 of an optimal embodiment contains alumina particles derived from alumina sol and silica particles derived from colloidal silica sol together with the water-based resin.

There is no particular limitation with respect to the method for forming the intermediate layer 3, and the intermediate layer 3 may be formed by dispersing or dissolving the water-based resin exemplified as above and optionally, additives if necessary in a water-based solvent to prepare a coating liquid for the intermediate layer, coating the receiving layer 2 with the thus prepared coating liquid using a conventionally known coating device such as the gravure coating method, the roll coat method, the screen printing method, the reverse roll coating method using a gravure plate, or the like, and then drying the coating liquid.

There is no particular limitation with respect to the thickness of the intermediate layer 3, and the thickness is preferably 0.01 μm or more and 5 μm or less, particularly preferably 0.02 μm or more and 3 μm or less. By setting the thickness of the intermediate layer 3 within this range, it is possible to sufficiently prevent elution of the silicone oil contained in the receiving layer 2 and to improve the foil cutting property of the transferable protective layer 10.

(Back Face Layer)

A back face layer (not shown) may be provided on the surface opposite to the surface of the substrate 1 on which the transfer layer 10 is provided. Incidentally, the back face layer is an optional constituent in the thermal transfer sheet 100 of one embodiment.

There is no limitation with respect to the material of the back face layer, and single resins or mixtures of natural or synthetic resins such as cellulosic resins, such as ethyl cellulose, methyl cellulose, cellulose acetate, cellulose acetate butyrate, nitro cellulose, cellulose acetate butyrate, and cellulose acetate propionate, vinyl-based resins, such as polyvinyl alcohol, polyvinyl acetate, polyvinyl butyral, polyvinyl acetal, and polyvinyl pyrrolidone, acrylic-based resins, such as polymethyl methacrylate, polyethyl acrylate, polyacrylamide, and acrylonitrile-styrene copolymers, polyamide resins, polyamide imide resins, coumarone-indene resins, polyester resins, polyurethane resins, and silicone-modified or fluorine-modified urethanes can be exemplified.

The back face layer may also contain a solid or liquid lubricant. As the lubricant, various waxes, such as polyethylene wax and paraffin wax, higher aliphatic alcohols, organo polysiloxanes, anionic surfactants, cationic surfactants, amphoteric surfactants, nonionic surfactants, fluorine-based surfactants, organic carboxylic acids and derivatives thereof, metal soaps, fluorine-based resins, silicone-based resins, and fine particles of inorganic compounds such as talc and silica and the like can be exemplified. The mass of the lubricant based on the total mass of the back face layer is preferably in the range of 5% by mass or more and 50% by mass or less, more preferably in the range of 10% by mass or more and 30% by mass or less.

There is no particular limitation with respect to the method for forming the back face layer, and the back face layer can be formed by preparing a coating liquid for the back face layer in which a resin, a lubricant to be added as required and the like are dissolved or dispersed in an appropriate solvent, coating the substrate 1 with the thus prepared coating liquid by a conventional coating device such as a gravure coater, a roll coater, and a wire bar, and then drying the coating liquid. The thickness of the back face layer is preferably in the range of 1 μm or more and 10 μm or less.

<<Thermal Transfer Sheet of Another Embodiment>>

Figure 2:
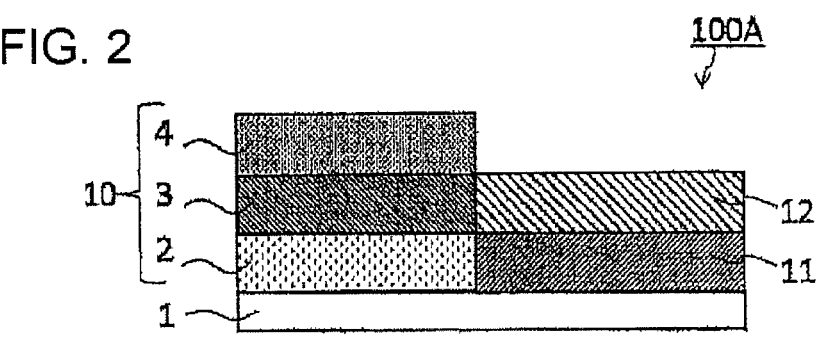
FIG. 2 is a schematic sectional view illustrating one example of a thermal transfer sheet of one embodiment.
Figure 3:
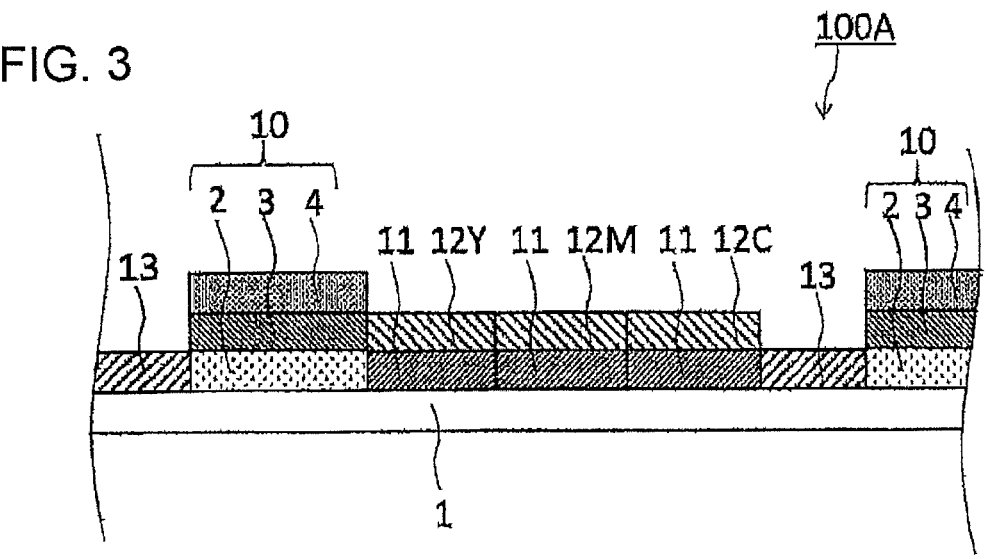
FIG. 3 is a schematic sectional view illustrating one example of a thermal transfer sheet of one embodiment.

In the thermal transfer sheet 100A of another embodiment, as shown in FIG. 2, the transfer layer 10 and the dye layer 12 are provided on the same surface of the substrate 1 successively in a surface by surface manner. In the embodiment shown, a dye primer layer 11 is provided between the substrate 1 and the dye layer 12. In other words, the thermal transfer sheet 100A of another embodiment takes a configuration where a dye layer 12 is further provided on the same surface on which the transfer layer 10 of the substrate 1 is also provided, in thermal transfer sheet 100 of one embodiment described above. In the thermal transfer sheet 100A of another embodiment shown in FIG. 2, as shown in FIG. 3, the transfer layer 10, the dye layer 12, and an optional protective layer 13 may also be provided on the same surface of the substrate 1 repeatedly and successively in a surface by surface manner. Alternatively, in an embodiment shown in FIG. 3, instead of or together with the optional protective layer 13, an optional coloring agent layer containing a pigment (not shown), an optional special color panel constituted by a hologram layer (not shown) or the like may be provided repeatedly and successively in a surface by surface manner. The order in which these optional layers are provided repeatedly and successively in a surface by surface manner is not limited to the forms shown.

According to the thermal transfer sheet 100A of another embodiment, for example, it is possible to perform both formation of the thermal transfer image-receiving sheet 200 as shown in FIG. 4 and formation of a thermally transferable image onto the receiving layer 2 of the thermal transfer image-receiving sheet formed. Specifically, by transferring the transfer layer 10 onto a transfer receiving article by using the thermal transfer sheet 100A of another embodiment, a thermal transfer image-receiving sheet in which the masking layer 4, the intermediate layer 3, and the receiving layer 2 are layered in this order on the transfer receiving article can be obtained. Additionally, transferring the dye contained in the dye layer 12 of the thermal transfer sheet 100A of another embodiment onto the receiving layer 2 of the thermal transfer image-receiving sheet 200 obtained by transferring the transfer layer 10 onto a transfer receiving article enables formation of a thermally transferable image.

Hereinafter, the respective constituents of the thermal transfer sheet 100A of another embodiment will be explained with focusing on differences between the thermal transfer sheet 100A and the thermal transfer sheet 100 of one embodiment. Unless otherwise particularly specified, ones described in the thermal transfer sheet 100 of one embodiment can be used as they are.

(Dye Layer)

The dye layer 12 contains a sublimable dye and a binder resin. In the dye layer 12, a layer of one color selected appropriately may be formed when the desired image is a monochromatic image, or a plurality of dye layers each containing a sublimable dye having a different hue, such as a yellow dye 12Y, a magenta dye 12M, and a cyan dye 12C may be repeatedly formed on the same surface of the same substrate successively in a surface by surface manner, when the desired image is a full-color image, as shown in FIG. 3. In the embodiment shown in FIG. 3, although the transfer layer 10, the yellow dye 12Y, the magenta dye 12M, the cyan dye 12C, and the protective layer 13 are repeatedly formed in this order on the same surface of the substrate, the layers may not be repeatedly formed. Alternatively, the layers may not be formed in this order. The dye layer 12 is not limited to one described hereinbelow, and a conventionally known dye layer in the field of thermal transfer sheets can be used as it is.

<<Sublimable Dye>>

There is no particular limitation with respect to the sublimable dye, and those having a sufficient color density and resistance to discoloration and fading due to light, heat, temperature and the like are preferred. As such a sublimable dye, diaryl methane-based dyes, triaryl methane-based dyes, thiazole-based dyes, merocyanine dyes, pyrazolone dyes, methine-based dyes, indoaniline-based dyes, pyrazolomethine-based dyes, azomethine-based dyes such as acetophenoneazomethine, pyrazoloazomethine, imidazoleazomethine, imidazoazomethine, and pyridoneazomethine, xanthene-based dyes, oxazine-based dyes, cyanostyrene-based dyes such as dicyanostyrene and tricyanostyrene, thiazine-based dyes, azine-based dyes, acridine-based dyes, benzeneazo-based dyes, azo-based dyes such as, pyridoneazo, thiopheneazo, isothiazoleazo, pyrroleazo, pyrazoleazo, imidazoleazo, thiadiazoleazo, triazoleazo, and disazo, spiropyran-based dyes, indolinospiropyran-based dyes, fluoran-based dyes, rhodaminelactam-based dyes, naphthoquinone-based dyes, anthraquinone-based dyes, quinophthalone-based dyes and the like can be exemplified. Specifically, red dyes such as MS Red G (manufactured by Mitsui Toatsu Chemicals Co., Ltd.), Macrolex Red Violet R (manufactured by Bayer AG), CeresRed 7B (manufactured by Bayer AG), and Samaron Red F3BS (manufactured by Mitsubishi Chemical Corporation), yellow dyes such as Holon Brilliant yellow 6GL (manufactured by Clariant), PTY-52 (manufactured by Mitsubishi Chemical Industries, Ltd.), and MACROLEX Yellow 6G (manufactured by Bayer AG), and blue dyes such as Kayaset Blue 714 (manufactured by Nippon Kayaku Co., Ltd.), Waxoline Blue AP-FW (manufactured by ICI), Holon Brilliant Blue S-R (manufactured by Sandoz), MS Blue 100 (Mitsui Toatsu Chemicals Co., Ltd.), C.I. Solvent blue 63, and the like can be exemplified.

The content of the sublimable dye is preferably in the range of 50% by mass or more and 350% by mass, more preferably in the range of 80% by mass or more and 300% by mass, based on the total solid content of the binder resin described later. When the content of the sublimable dye is less than the above range, the printing density tends to decrease. When the content of the sublimable dye exceeds the above range, the preservability and the like tend to decrease.

<<Binder Resin>>

There is no particular limitation with respect to the binder resin which is contained in the dye layer and used for carrying the above sublimable dye, and those having a certain degree of heat resistance and having a moderate affinity with the sublimable dye can be used. As such a binder resin, cellulosic resins, such as ethyl cellulose, methyl cellulose, cellulose acetate, cellulose acetate butyrate, nitro cellulose, cellulose acetate butyrate, and cellulose acetate propionate, vinyl-based resins, such as polyvinyl alcohol, polyvinyl acetate, polyvinyl butyral, polyvinyl acetoacetal, and polyvinyl pyrrolidone, acryl resins such as poly(meth)acrylate and poly(meth)acrylamide, polyurethane-based resins, polyamide-based resins, polyester-based resin, and the like can be exemplified.

There is no particular limitation with respect to the content of the binder resin, but when the content of the binder resin based on the total solid content of the dye layer 12 is less than 20% by mass, it is not possible to sufficiently retain the sublimable dye in the dye layer 12, and thus the preservability tends to decrease. Therefore, the binder resin is preferably contained in an amount of 20% by mass or more based on the total solid content of the dye layer 12. There is no particular limitation with respect to the upper limit of the content of the binder resin, and the upper limit can be set as appropriate depending on the content of the sublimable dye and optional additives.

The dye layer 12 may also contain additives such as inorganic particles and organic particulates. As the inorganic particles, talc, carbon black, aluminum, molybdenum disulfide and the like can be exemplified, and as the organic particulates, polyethylene waxes, silicone resin particulates, and the like can be exemplified. The dye layer 12 may contain a release agent. As the release agent, modified or non-modified silicone oils (including those called silicone resins), phosphoric acid ester, fatty acid esters, and the like can be exemplified.

There is no particular limitation with respect to the method for forming the dye layer 12, and the dye layer 12 can be formed by dispersing or dissolving the binder resin, the sublimable dye, optionally, additives if necessary and the release agent in an appropriate solvent to prepare a coating liquid for the dye layer, coating the dye primer layer 11 described later with the thus prepared coating liquid for the dye layer using a conventionally known coating device such as a gravure coater, a roll coater, and a wire bar, and then drying the coating liquid. The thickness of the dye layer is generally in the range of 0.2 μm or more and 2.0 μm or less.

(Dye Primer Layer)

Between the substrate 1 and the dye layer 12, a dye primer layer 11 intended to improve the adhesion between the substrate 1 and the dye layer 12 may be provided.

There is no particular limitation with respect to the dye primer layer 11, and a conventionally known dye primer layer in the field of thermal transfer sheet can be appropriately selected and used. One example of the dye primer layer 11 is constituted by a resin material. As the resin material constituting the dye primer layer 11, polyester-based resins, polyvinyl pyrrolidone resins, polyvinyl alcohol resins, hydroxyethyl cellulose, polyacrylic acid ester-based resins, polyvinyl acetate-based resins, polyurethane-based resins, styrene acrylate-based resins, polyacrylamide-based resins, polyamide-based resins, polyether-based resins, polystyrene-based resins, polyethylene-based resins, polypropylene-based resins, polyvinyl chloride resins, polyvinyl acetal-based resins such as polyvinyl acetoacetal, polyvinyl butyral, and the like can be exemplified. The dye primer layer 11 may also contain various additives such as organic particles and inorganic particles together with these resin components.

There is no particular limitation with respect to the method for forming the dye primer layer 11, and the dye primer layer may be formed by dispersing or dissolving the resin component exemplified as above and optionally, additives if necessary in an appropriate solvent to prepare a coating liquid for the dye primer layer, coating the substrate 1 with the thus prepared coating liquid using a conventionally known coating device such as the gravure coating method, the roll coat method, the screen printing method, the reverse roll coating method using a gravure plate, or the like, and then drying the coating liquid. There is no particular limitation with respect to the thickness of the dye primer layer 11, and the thickness is usually in the range of 0.02 μm or more and 1 μm or less.

<<Method for Producing Thermal Transfer Sheet>>

Subsequently, the method for producing the thermal transfer sheet of one embodiment of the present invention (hereinafter, the method is referred to as the method for producing the thermal transfer sheet of one embodiment) will be described. The method for producing the thermal transfer sheet of one embodiment comprises a step of forming a transfer layer onto the substrate, wherein the step of forming a transfer layer comprises a step of coating the substrate with a coating liquid for a receiving layer containing a solvent-based resin, a silicone oil, and a solvent to form a receiving layer, a step of coating the receiving layer with a coating liquid for an intermediate layer containing a water-based resin and a water-based solvent to form an intermediate layer, and a step of coating the intermediate layer with a coating liquid for a masking layer containing a solvent-based resin, a colorant, and an organic solvent to form a masking layer.

According to the method for producing the thermal transfer sheet of one embodiment having the characteristic described above, it is possible to produce the thermal transfer sheet of one embodiment described above. In each step, the respective constituents of the thermal transfer sheet of one embodiment described above can be appropriately selected. There is no particular limitation with respect to the amount for coating of each coating liquid, and the amount for coating may be appropriately set so as to obtain the thickness exemplified in the thermal transfer sheet of one embodiment, for example.

(Step of Forming Receiving Layer)

The present step is a step of forming a receiving layer containing a solvent-based resin and a silicone oil on a substrate by coating the substrate with a coating liquid for the receiving layer containing the solvent-based resin, the silicone oil, and an organic solvent. As the solvent-based resin, the silicone oil, and the organic solvent, the solvent-based resin, the silicone oil, and the organic solvent described in the receiving layer 2 of the thermal transfer sheet of one embodiment described above can be appropriately selected and used, and a detailed description for the sheet is omitted here.

(Step of Forming Intermediate Layer)

The present step is a step of forming an intermediate layer by coating the receiving layer with a coating liquid for the intermediate layer containing a water-based resin and a water-based solvent. As the water-based resin and the water-based solvent contained in the coating liquid for the intermediate layer, the water-based resin and the water-based solvent described in the intermediate layer 3 of the thermal transfer sheet of one embodiment can be appropriately selected and used, and a detailed description for the sheet is omitted here.

(Step of Forming Masking Layer)

The present step is a step of forming a masking layer by coating the intermediate layer with a coating liquid for the masking layer containing a solvent-based resin, a colorant, and an organic solvent. The thermal transfer sheet 100 of one embodiment described above is obtained via the present step. As the solvent-based resin, the colorant, and the organic solvent contained in the coating liquid for the masking layer, the solvent-based resin, the colorant, and the organic solvent described in the masking layer 4 of the thermal transfer sheet of one embodiment described above can be appropriately selected and used, and a detailed description for the sheet is omitted here.

The method for producing the thermal transfer sheet of one embodiment may comprise an optional step such as a step of forming a dye layer on one surface of the substrate successively in a surface by surface manner with the transfer layer 10 formed as described above and a step of forming a back face layer on the other surface of the substrate. That is, a step of producing various forms of the thermal transfer sheet 100 of one embodiment may be comprised.

<<Thermal Transfer Image-Receiving Sheet>>

Subsequently, the thermal transfer image-receiving sheet of one embodiment of the present invention (hereinbelow, the sheet is referred to as the thermal transfer image-receiving sheet of one embodiment) will be described. As shown in FIG. 4, a thermal transfer image-receiving sheet 200 of one embodiment adopts a structure in which a pattern layer 40, a masking layer 4, an intermediate layer 3, and a receiving layer 2 are provided in this order on a substrate 31 and a portion of the surface of the pattern layer 40 is exposed. The thermal transfer image-receiving sheet 200 of one embodiment is characterized in that the masking layer 4 and the receiving layer 2 contain a solvent-based resin and that the intermediate layer 3 contains a water-based resin. FIG. 4 is a schematic sectional view of the thermal transfer image-receiving sheet of one embodiment.

According to the thermal transfer image-receiving sheet 200 of one embodiment having the above characteristic, it is possible to make the releasability between the receiving layer 2 and the dye layer when a thermally transferable image is formed on the receiving layer 2 satisfactory. The above-described effect in the thermal transfer image-receiving sheet 200 of one embodiment is caused by the same reason described in the thermal transfer sheet 100 of one embodiment described above.

The thermal transfer image-receiving sheet 200 of one embodiment adopts a structure in which a portion of the surface of the pattern layer 40 is exposed. This is because the surface of the pattern layer 40 is masked by the masking layer 4 in the case where the surface of the pattern layer 40 is not exposed. It is also possible to use a thermal transfer image-receiving sheet in which a masking layer is provided on the pattern layer 40 such that the surface of the pattern layer 40 is not exposed. According to this thermal transfer image-receiving sheet 200, for example, by forming a thermally transferable image on the receiving layer 2 of the thermal transfer image-receiving sheet 200 by using a substrate having transparency as the substrate 31, it is possible to obtain a printed product 300 which makes only the thermally transferable image visible from one surface of the substrate 31 and makes only the pattern layer 40 visible from the other surface of the substrate 31. Accordingly, in the method for forming a printed product described later, it is also possible to use a thermal transfer image-receiving sheet 200 in which the masking layer 4 is provided on the pattern layer 40 such that the surface of the pattern layer 40 is not exposed.

(Substrate of Thermal Transfer Image-Receiving Sheet)

There is no particular limitation with respect to the substrate 31 of the thermal transfer image-receiving sheet 200 (hereinbelow, the substrate is referred to as the substrate 31), and conventionally known substrates can be appropriately selected and used as the substrate of the thermal transfer image-receiving sheet. As the substrate 31 generally used in the field of thermal transfer image-receiving sheets, paper substrates such as wood-free paper, art paper, lightweight coated paper, lightly coated paper, coated paper, castcoated paper, synthetic resin or emulsion-impregnated paper, synthetic rubber latex-impregnated paper, and synthetic resin internally added paper can be exemplified. In addition to these, the substrate 1 described in the above thermal transfer sheet 100 of one embodiment can be used as it is.

(Pattern Layer)

The pattern layer 40 is provided on the substrate 31. The pattern layer 40 may be a layer on which some patterns are formed or a colored layer, and there is no limitation with respect to the pattern on the pattern layer 40.

Figure 5:
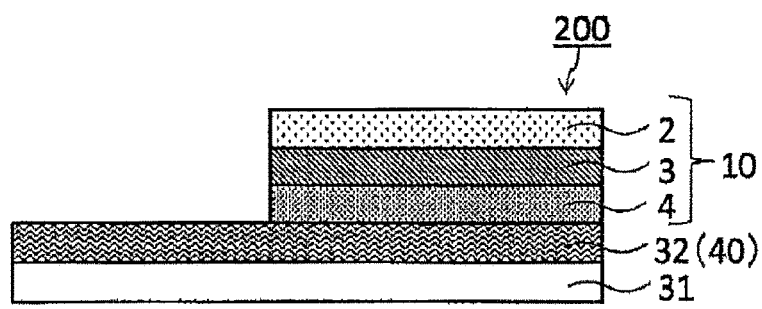
FIG. 5(a) is a schematic sectional view illustrating one example of a thermal transfer image-receiving sheet of one embodiment.
FIG. 5(b) is a schematic sectional view illustrating one example of a thermal transfer image-receiving sheet of one embodiment.
FIG. 5(c) is a schematic sectional view illustrating one example of a thermal transfer image-receiving sheet of one embodiment.
Figure 5:
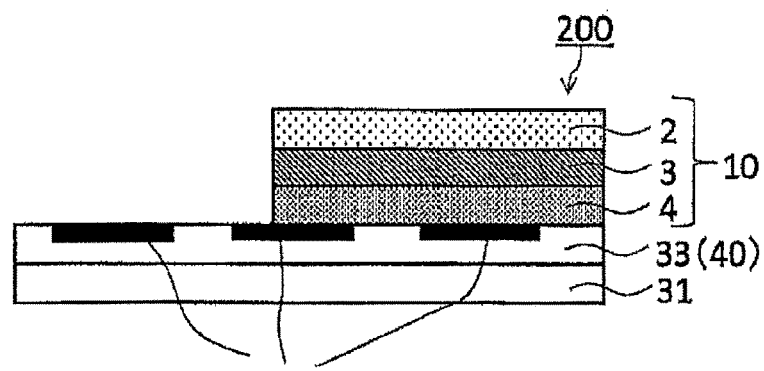
Figure 5:
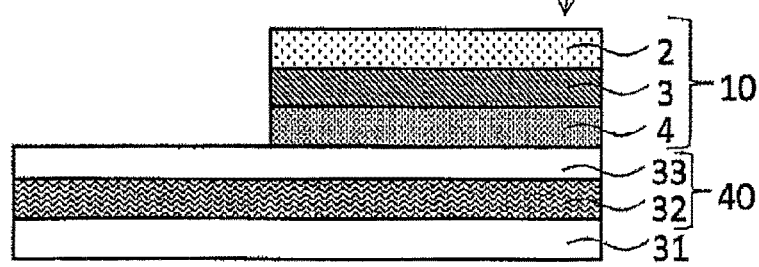

For example, as shown in FIG. 5(a), a conventionally known hologram layer 32 may be used as the pattern layer 40, or as shown in FIG. 5(b), a second receiving layer 33 on which a thermally transferable image is formed may be used as the pattern layer 40, or as shown in FIG. 5(c), a laminate in which the hologram layer 32 and the second receiving layer 33 are layered from the substrate 31 side may be used as the pattern layer 40. Instead of the embodiment shown in FIG. 5(*b*), the pattern layer 40 may be formed directly on the substrate 31 without providing the second receiving layer 33. The second receiving layer 33 in FIG. 5(*c*) is a receiving layer before a thermally transferable image is formed, but may be a receiving layer on which a thermally transferable image has been formed in advance. Using the second receiving layer 33 as the receiving layer before formation of a thermally transferable image enables formation of a thermally transferable image onto the receiving layer 2 as well as formation of a thermally transferable image onto the second receiving layer 33. There is no limitation with respected to the second receiving layer 33, and conventionally known receiving layers can be appropriately selected and used as the receiving layer of the thermal transfer image-receiving sheet. For example, the receiving layer 2 described in the above thermal transfer sheet 100 of one embodiment can be used as it is. As the hologram layer 32, for example, a layer having an uneven pattern (interference fringes) or a sheet onto which a hologram as commercially available is formed may be used, and layers including a colored hologram such as gold-colored one, silver-colored one or the like colored by metal deposition may also be used. FIGS. 5(*a*) to (*c*) are schematic sectional views of the thermal transfer image-receiving sheet of one embodiment.

As the masking layer 4 and the intermediate layer 3, the masking layer 4 and the intermediate layer 3 described in the thermal transfer sheet of the above one embodiment can be used as they are. As the receiving layer 2, the receiving layer 2 described in the thermal transfer sheet of the above one embodiment can be used as it is.

There is no particular limitation with respect to the method for forming the thermal transfer image-receiving sheet 200 of one embodiment, and a method in which, by using the thermal transfer sheet 100 of one embodiment described above, the transfer layer 10 of the thermal transfer sheet 100 is transferred onto the substrate 31 including the pattern layer 40 provided on the surface such that a portion of the surface of the pattern layer 40 is exposed, and a thermally transferable image is formed on the transfer layer 10 transferred and the like can be exemplified.

<<Method for Producing Thermal Transfer Image-Receiving Sheet>>

Subsequently, the method for producing a thermal transfer image-receiving sheet of one embodiment of the present invention (hereinafter, the method is referred to as the method for producing a thermal transfer image-receiving sheet of one embodiment) will be described. The method for producing a thermal transfer image-receiving sheet of one embodiment comprises a step of providing a transfer receiving article on which a pattern layer is provided and the thermal transfer sheet of various embodiment described above, and a step of transferring the transfer layer of the thermal transfer sheet provided in the providing step onto the pattern layer of the transfer receiving article provided in the providing step such that a portion of the surface of the pattern layer is exposed.

In other words, the method for producing a thermal transfer image-receiving sheet of one embodiment comprises a step of transferring the transfer layer of the thermal transfer sheet onto the pattern layer possessed by the transfer receiving article such that a portion of the surface of the pattern layer is exposed, wherein the thermal transfer sheet used in the transferring step is the thermal transfer sheet of various embodiment described above.

According to the method for producing a thermal transfer image-receiving sheet of one embodiment having the characteristic described above, it is possible to produce the thermal transfer image-receiving sheet 200 of one embodiment described above.

(Step of Providing Transfer Receiving Article)

As the transfer receiving article of the pattern layer provided in the present step, a substrate 31 on which the pattern layer 40 is formed described in the thermal transfer image-receiving sheet of one embodiment described above can be appropriately selected and used, and a detailed description for the sheet is omitted here.

(Step of Providing Thermal Transfer Sheet)

As the thermal transfer sheet provided in the present step, the thermal transfer sheets of various embodiment described above can be appropriately selected and used, and a detailed description for the sheet is omitted here.

(Step of Transferring Transfer Layer)

The present step is a step of transferring the transfer layer of a thermal transfer sheet by using the transfer receiving article and the thermal transfer sheet provided in the providing step described above in combination such that a portion of the surface of the pattern layer is exposed on the pattern layer possessed by the transfer receiving article. A thermal transfer image-receiving sheet in which the transfer layer is transferred onto the transfer receiving article and a portion of the surface of the pattern layer possessed by the transfer receiving article is exposed is obtained via the present step. In other words, the above thermal transfer image-receiving sheet of one embodiment is obtained. For transferring the transfer layer, in addition to methods in which a heating device such as a thermal head or the like is used, for example, the hot stamping method, the heat roll method, or the like may be employed. The transfer layer can also be transferred by methods other than these. The same applies to a step of transferring the transfer layer in formation of a printed product described later.

<<Method for Forming Printed Product>>

Subsequently, the method for forming a printed product of one embodiment of the present invention (hereinbelow, referred to as the method for forming a printed product of one embodiment) will be described. The method for forming a printed product of one embodiment comprises a step of providing a transfer receiving article on which a pattern layer is provided and the thermal transfer sheet of various embodiment described above, a step of transferring the transfer layer of the thermal transfer sheet provided in the providing step onto the pattern layer of the transfer receiving article provided in the providing step such that a portion of the surface of the pattern layer is exposed, and a step of forming a thermally transferable image on the transfer layer transferred on the pattern layer.

In other words, the method for forming a printed product of one embodiment comprises a step of transferring the transfer layer of a thermal transfer sheet such that a portion of the surface of the pattern layer is exposed on the pattern layer possessed by the transfer receiving article and a step of forming a thermally transferable image on the transfer layer transferred onto the pattern layer, wherein the thermal transfer sheet used in the transferring step is a thermal transfer sheet of various embodiments described above.

(Step of Providing Thermal Transfer Sheet)

As the thermal transfer sheet provided in the present step, the thermal transfer sheets of various embodiment described above can be used as they are, and a detailed description for the sheet is omitted here.

As the transfer receiving article on which a pattern layer is provided, a transfer receiving article in which the pattern layer is provided on the substrate and the like can be exemplified. For example, the substrate 31, the pattern layer 40, and the like described in the above thermal transfer image-receiving sheet 200 of one embodiment may be appropriately selected to form a transfer receiving article including the pattern layer provided on the substrate. This pattern layer 40 includes a pattern layer 40 in which a thermally transferable image is finally formed to provide a pattern. Specifically, the pattern layer 40 may be a receiving layer before a thermally transferable image is formed. Alternatively, a plastic card mainly composed of plain paper, wood-free paper, tracing paper, a plastic film, vinyl chloride, a vinyl chloride-vinyl acetate copolymer, polycarbonate, and materials other than these is used as a transfer receiving article, onto which a pattern layer may be provided.

(Step of Transferring Transfer Layer)

The present step is a step of transferring the transfer layer of a thermal transfer sheet by using the transfer receiving article and the thermal transfer sheet provided in the providing step described above in combination such that a portion of the surface of the pattern layer is exposed on the pattern layer possessed by the transfer receiving article. In other words, the step is a step of transferring the transfer layer of the thermal transfer sheet provided in the above providing step onto the pattern layer of the transfer receiving article provided in the same providing step such that a portion of the surface of the pattern layer is exposed. A thermal transfer image-receiving sheet formed by transferring the transfer layer onto the transfer receiving article including the pattern layer provided is obtained via the present step. In other words, the above thermal transfer image-receiving sheet of one embodiment is obtained.

According to the method for forming a printed product of one embodiment in which the thermal transfer sheet provided in the providing step described above is used as a thermal transfer sheet of various embodiment described above, it is possible to transfer the transfer layer, with good transferability, onto the transfer receiving article on which the pattern layer has been provided in the step of transferring the transfer layer.

(Step of Forming Thermally Transferable Image)

The present step is a step of forming a thermally transferable image by allowing a sublimable dye to diffuse and transfer onto the transfer layer of the thermal transfer image-receiving sheet obtained in the transferring step described above, in other words, onto the receiving layer located on the outermost surface after the transfer layer is transferred. A printed product in which the masking layer, the intermediate layer, and the receiving layer are provided in this order on the transfer receiving article having the pattern layer such that a portion of the pattern layer is exposed and a thermally transferable image is formed on the receiving layer is obtained via the present step. The thermally transferable image can be formed by using a heating device such as a thermal head or the like. The thermally transferable image can also be formed by using a method other than these.

As the thermal transfer sheet for allowing the sublimable dye to diffuse and transfer, in the case where the thermal transfer sheet provided in the providing step described above is the thermal transfer sheet 100A of another embodiment comprising the dye layer 12 described above, this thermal transfer sheet can be used as it is. Alternatively, in the case where the thermal transfer sheet provided in the providing step described above is the thermal transfer sheet 100 of one embodiment described above not comprising the dye layer 12, a conventionally known thermal transfer sheet comprising a dye layer containing a sublimable dye may be used.

Figure 6:
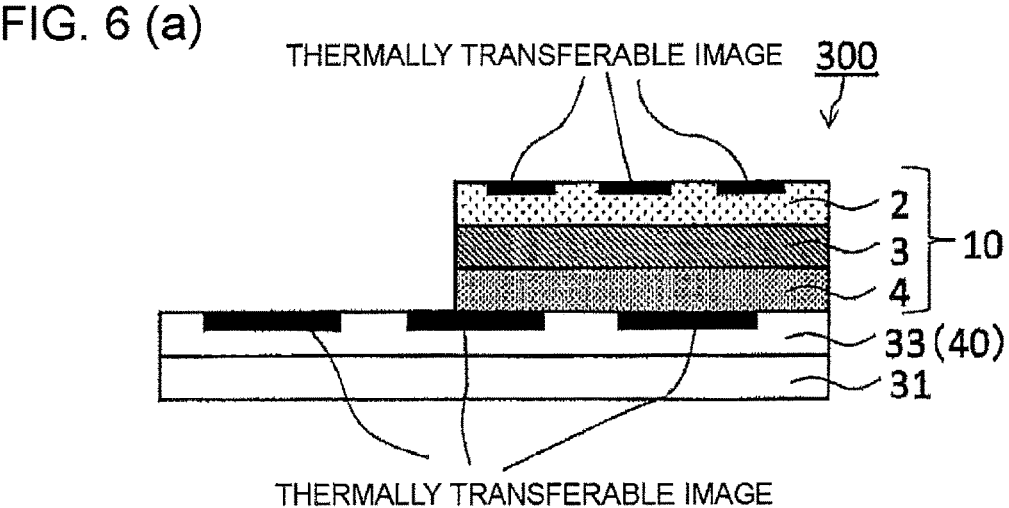
FIG. 6(a) is a schematic sectional view illustrating one example of a printed product formed by a method for forming a printed product of one embodiment.
FIG. 6(b) is a schematic sectional view illustrating one example of a printed product of one embodiment.
Figure 6:
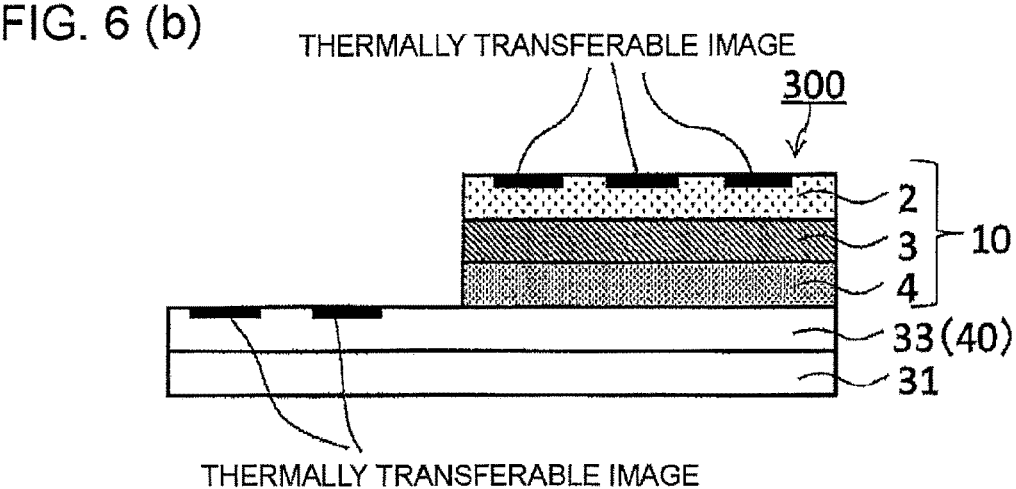

FIG. 6 is a schematic sectional view illustrating one example of a printed product 300 formed by the method for forming a printed product of one embodiment. In the case where the pattern layer 40 of the transfer receiving article provided in the providing step is the second receiving layer 33 including a thermally transferable image formed in advance, a thermally transferable image is formed on the receiving layer 2 provided on the intermediate layer 3 in the step of forming a thermally transferable image, and, as shown in FIG. 6(a), a printed product 300 in which a portion of the pattern layer 40 is masked by the masking layer 4 and a thermally transferable image is formed on the masking layer is obtained. In contrast, in the case where the pattern layer 40 of the transfer receiving article provided in the providing step is the second receiving layer 33 before a thermally transferable image is formed, in the step of forming a thermally transferable image, the thermally transferable image is formed on the second receiving layer 33 of the transfer receiving article of which surface is exposed and the thermally transferable image is formed also on the receiving layer 2 provided on the intermediate layer 3, and thus, a printed product 300 of the embodiment shown in FIG. 6(b) is obtained. The pattern layer 40 is not limited to the embodiment shown, and various forms of the pattern layer 40 described in the thermal transfer image-receiving sheet 200 of one embodiment can be appropriately selected and used.

In the method for forming a printed product of one embodiment described hereinabove, the receiving layer 2 and the masking layer 4 constituting the transfer layer of the thermal transfer sheet provided in the providing step contain a solvent-based resin, and the intermediate layer 3 provided between the receiving layer 2 and the masking layer 4 contains a water-based resin. This can make the releasability of the receiving layer and the dye layer 12 satisfactory. It is also possible to make the releasability satisfactory when the transfer layer of the thermal transfer sheet is transferred onto the pattern layer of the transfer receiving article such that a portion of the surface of the pattern layer is exposed. Alternatively, use of the thermal transfer sheet of another embodiment enables formation of a thermally transferable image by means of one thermal transfer sheet.

<<Printed Product>>

Subsequently, the printed product 300 of one embodiment of the present invention (hereinbelow, referred to as the printed product of one embodiment) will be described. As shown in FIGS. 6(a) and (b), the printed product 300 of one embodiment is characterized by having a thermally transferable image formed on the receiving layer 2 of the thermal transfer image-receiving sheet 200 of one embodiment described above.

EXAMPLES

Next, the present invention will be described more concretely with demonstrating examples. Unless otherwise specified below, the "part" and "%" are based on the mass. For components having a solid component ratio, a mass value in terms of solid content is indicated.

Example 1

Using a polyethylene terephthalate film of 5 µm in thickness as a substrate, the substrate was coated with a coating liquid for the back face layer having the following composition so as to reach 1.0 g/m² in a dried state, and a back face layer was formed. Then, the surface of the substrate opposite to the surface on which the back face layer was provided was coated with a coating liquid 1 for the first receiving layer having the following composition so as to reach 1.0 g/m² in a dried state, and a first receiving layer was formed. Then, the first receiving layer was coated with a coating liquid 1 for the first intermediate layer having the following composition so as to reach 0.15 g/m² in a dried state, and a first intermediate layer was formed. Then, the first intermediate layer was coated with a coating liquid for the masking layer having the following composition so as to reach 2.0 g/m² in a dried state, and a masking layer was formed. Thus, the thermal transfer sheet of Example 1 was obtained, wherein the transfer layer including the first receiving layer, the first intermediate layer, and the masking layer layered in this order was provided on one surface of the substrate and the back face layer was provided on the other surface of the substrate.

| <Coating liquid for the back face layer> | |
|---|---|
| Polyvinyl butyral resin (S-LEC BX-1, SEKISUI CHEMICAL CO., LTD.) | 1.8 parts |
| Polyisocyanate (BURNOCK D750, DIC Corporation) | 5.5 parts |
| Phosphoric acid ester-based surfactant (PLYSURF A208N, DKS Co. Ltd.) | 1.6 parts |
| Talc (MICRO ACE P-3, NIPPON TALC Co., Ltd.) | 0.35 parts |
| Toluene | 18.5 parts |
| Methyl ethyl ketone | 18.5 parts |

| <Coating liquid 1 for the first receiving layer> | |
|---|---|
| Vinyl chloride-vinyl acetate copolymer resin (SOLBIN CNL, Nissin Chemical Co., Ltd.) | 15.8 parts |
| Vinyl chloride-vinyl acetate copolymer resin (SOLBIN C, Nissin Chemical Co., Ltd.) | 1.0 part |
| Epoxy aralkyl-modified silicone oil (X-22-3000T, Shin-Etsu Chemical Co., Ltd.) | 1.2 parts |
| Methyl styrene-modified silicone oil (X-24-510, Shin-Etsu Chemical Co., Ltd.) | 1.2 parts |
| Polyether modified-silicone oil (KF-352A, Shin-Etsu Chemical Co., Ltd.) | 0.8 parts |
| Methyl ethyl ketone | 40 parts |
| Toluene | 40 parts |

| <Coating liquid 1 for the first intermediate layer> | |
|---|---|
| Water-based urethane resin (solid content 26%) (Tg: −17° C.) (SUPERFLEX 650, DKS Co. Ltd.) | 5 parts |
| Water/isopropyl alcohol (1:1) mixed solvent | 95 parts |

| <Coating liquid for the masking layer> | |
|---|---|
| Acrylic-based resin | 3 parts |
| Vinyl chloride-vinyl acetate copolymer resin | 1 part |
| Titanium oxide | 16 parts |
| Methyl ethyl ketone | 40 parts |
| Toluene | 40 parts |

Example 2

The thermal transfer sheet of Example 2 was obtained totally in the same manner as in Example 1 except that the coating liquid 1 for the first intermediate layer was replaced by a coating liquid 2 for the first intermediate layer having the following composition.

| <Coating liquid 2 for the first intermediate layer> | |
|---|---|
| Water-based urethane resin (solid content 30%) (Tg: 27° C.) (HYDRAN AP-20, DIC Corporation) | 5 parts |
| Water/isopropyl alcohol (1:1) mixed solvent | 95 parts |

Example 3

The thermal transfer sheet of Example 3 was obtained totally in the same manner as in Example 1 except that the coating liquid 1 for the first intermediate layer was replaced by a coating liquid 3 for the first intermediate layer having the following composition.

| <Coating liquid 3 for the first intermediate layer> | |
|---|---|
| Water-dispersed polyester resin (solid content 25%) (Tg: 20° C.) (VYLONAL MD-1480, TOYOBO CO., LTD.) | 5 parts |
| Water/isopropyl alcohol (1:1) mixed solvent | 95 parts |

Example 4

The thermal transfer sheet of Example 4 was obtained totally in the same manner as in Example 1 except that the coating liquid 1 for the first receiving layer was replaced by a coating liquid 2 for the first receiving layer having the following composition.

| <Coating liquid 2 for the first receiving layer> | |
|---|---|
| Vinyl chloride-vinyl acetate copolymer resin (SOLBIN CNL, Nissin Chemical Co., Ltd.) | 17.9 parts |
| Vinyl chloride-vinyl acetate copolymer resin (SOLBIN C, Nissin Chemical Co., Ltd.) | 1.1 parts |
| Epoxy aralkyl-modified silicone oil (X-22-3000T, Shin-Etsu Chemical Co., Ltd.) | 0.375 parts |
| Methyl styrene-modified silicone oil (X-24-510, Shin-Etsu Chemical Co., Ltd.) | 0.375 parts |
| Polyether modified-silicone oil (KF-3521, Shin-Etsu Chemical Co., Ltd.) | 0.25 parts |
| Methyl ethyl ketone | 40 parts |
| Toluene | 40 parts |

Example 5

The thermal transfer sheet of Example 5 was obtained totally in the same manner as in Example 1 except that the coating liquid 1 for the first receiving layer was replaced by a coating liquid 3 for the first receiving layer having the following composition.

| <Coating liquid 3 for the first receiving layer> | |
|---|---|
| Vinyl chloride-vinyl acetate copolymer resin (SOLBIN CNL, Nissin Chemical Co., Ltd.) | 13.75 parts |
| Vinyl chloride-vinyl acetate copolymer resin (SOLBIN C, Nissin Chemical Co., Ltd.) | 0.85 parts |
| Epoxy aralkyl-modified silicone oil | 2.025 parts |

-continued

<Coating liquid 3 for the first receiving layer>

| | |
|---|---|
| (X-22-3000T, Shin-Etsu Chemical Co., Ltd.) Organic-modified silicone oil | 2.025 parts |
| (X-24-510, Shin-Etsu Chemical Co., Ltd.) Polyether modified-silicone oil | 1.35 parts |
| (KF-352A, Shin-Etsu Chemical Co., Ltd.) Methyl ethyl ketone | 40 parts |
| Toluene | 40 parts |

Example 6

The thermal transfer sheet of Example 6 was obtained totally in the same manner as in Example 1 except that the coating liquid 1 for the first receiving layer was replaced by a coating liquid 4 for the first receiving layer having the following composition.

<Coating liquid 4 for the first receiving layer>

| | |
|---|---|
| Vinyl chloride-vinyl acetate copolymer resin (SOLBIN CNL, Nissin Chemical Co., Ltd.) | 15.8 parts |
| Vinyl chloride-vinyl acetate copolymer resin (SOLBIN C, Nissin Chemical Co., Ltd.) | 1 part |
| Epoxy-modified silicone oil (KF-101, Shin-Etsu Chemical Co., Ltd.) | 1.2 parts |
| Methyl styrene-modified silicone oil (X-24-510, Shin-Etsu Chemical Co., Ltd.) | 1.2 parts |
| Polyether modified-silicone oil (KF-352A, Shin-Etsu Chemical Co., Ltd.) | 0.8 parts |
| Methyl ethyl ketone | 40 parts |
| Toluene | 40 parts |

Example 7

The thermal transfer sheet of Example 7 was obtained totally in the same manner as in Example 1 except that the coating liquid 1 for the first intermediate layer was replaced by a coating liquid 4 for the first intermediate layer having the following composition.

<Coating liquid 4 for the first intermediate layer>

| | |
|---|---|
| Polyvinyl pyrrolidone resin (solid content ≥95%) (Tg: 174° C.) (K-90, NIPPON SHOKUBAI CO., LTD.) | 5 parts |
| Water/isopropyl alcohol (1:1) mixed solvent | 95 parts |

Example 8

The thermal transfer sheet of Example 8 was obtained totally in the same manner as in Example 1 except that the coating liquid 1 for the first intermediate layer was replaced by a coating liquid 5 for the first intermediate layer having the following composition.

<Coating liquid 5 for the first intermediate layer>

| | |
|---|---|
| Water-based urethane resin (solid content 35%) (Tg: 101° C.) (SUPERFLEX SF-130, DKS Co. Ltd.) | 5 parts |
| Water/isopropyl alcohol (1:1) mixed solvent | 95 parts |

Example 9

The thermal transfer sheet of Example 9 was obtained totally in the same manner as in Example 1 except that the coating liquid 1 for the first intermediate layer was replaced by a coating liquid 6 for the first intermediate layer having the following composition.

<Coating liquid 6 for the first intermediate layer>

| | |
|---|---|
| Water-based polyester resin (solid content 25%) (Tg: 64° C.) (PLAS COAT Z-561, GOO CHEMICAL CO., LTD.) | 5 parts |
| Water/isopropyl alcohol (1:1) mixed solvent | 95 parts |

Comparative Example 1

The thermal transfer sheet of Comparative Example 1 was obtained totally in the same manner as in Example 1 except that no first intermediate layer was formed.

Comparative Example 2

The thermal transfer sheet of Comparative Example 2 was obtained totally in the same manner as in Example 1 except that the coating liquid 1 for the first intermediate layer was replaced by a coating liquid A for the first intermediate layer having the following composition.

<Coating liquid A for the first intermediate layer>

| | |
|---|---|
| Polyester resin (Tg: 53° C.) (Vylon 220, TOYOBO CO., LTD.) | 5 parts |
| Toluene/Methyl ethyl ketone (1:1) mixed solvent | 95 parts |

<Formation of Transfer Receiving Article>

Using a polyethylene terephthalate film of 25 μm in thickness as a substrate, this substrate was coated with a coating liquid for the hologram layer having the following composition by the gravure coating method so as to reach an amount for coating of 2 g/m² in a dried state. Using a metal sheet on which interference fringes of a hologram had been unevenly formed, the layer after coating was embossed to impart unevenness of the hologram thereto, and thereby a hologram layer was formed. Thereafter, on the surface of the hologram layer onto which the unevenness had been imparted, aluminum was vapor-deposited so as to obtain a thickness of 30 nm to form a reflective layer, and thus, a hologram sheet in which the substrate, the hologram layer, and the reflective layer were layered in this order was obtained.

<Coating liquid for the hologram layer>

| | |
|---|---|
| Acryl resin | 40 parts |
| Melamine resin | 10 parts |
| Cyclohexanone | 50 parts |
| Methyl ethyl ketone | 50 parts |

Subsequently, using RC paper (STF-150, manufactured by Mitsubishi Paper Mills Limited, 190 μm) as a support, this support was coated with a coating liquid for the adhesive layer having the following composition by the gravure coating method so as to reach an amount for coating of 3.0 g/m² in a dried state to form an adhesive layer. The hologram sheet obtained above was laminated using the adhesive layer such that the reflective layer of the hologram sheet was opposed to the support to thereby obtain a laminate (support/adhesive layer/reflective layer/hologram layer/substrate).

| <Coating liquid for the adhesive layer> | |
|---|---|
| Polyfunctional polyol (TAKELAC A-969-V, Takeda Pharmaceutical Company Limited.) | 30 parts |
| Isocyanate (TAKELAC A-5, Takeda Pharmaceutical Company Limited.) | 10 parts |
| Ethyl acetate | 60 parts |

Subsequently, the substrate of the laminate (support/adhesive layer/reflective layer/hologram layer/substrate) obtained above was coated with a coating liquid for the second intermediate layer having the following composition by the gravure coating method so as to reach an amount for coating of 1.2 g/m² in a dried state to form a second intermediate layer. The second intermediate layer was coated with a coating liquid for the second receiving layer having the following composition by the gravure coating method so as to reach an amount for coating of 4.0 g/m² in a dried state to form the second receiving layer, and thus, the transfer receiving article in which the support/adhesive layer/reflective layer/hologram layer/substrate/second intermediate layer/second receiving layer were layered in this order was obtained.

| <Coating liquid for the second intermediate layer> | |
|---|---|
| Water-dispersed polyester resin (Tg 20° C.) (VYLONAL MD-1480, TOYOBO CO., LTD.) | 10 parts |
| Electrically conductive synthetic layer silicate (average primary particle size 25 nm) (LAPONITE JS, Wilbur-Ellis) | 10 parts |
| Water | 80 parts |

| <Coating liquid for the second receiving layer> | |
|---|---|
| Vinyl chloride-vinyl acetate copolymer (SOLBIN C, Nissin Chemical Co., Ltd.) | 15 parts |
| Silicone (X-22-3000T, Shin-Etsu Chemical Co., Ltd.) | 0.75 parts |
| Silicone (X-24-510, Shin-Etsu Chemical Co., Ltd.) | 0.1 parts |
| Methyl ethyl ketone | 33 parts |
| Toluene | 33 parts |

(Production of Thermal Transfer Sheet (i))

Using a polyethylene terephthalate film of 5 μm in thickness as a substrate, this substrate was coated with a coating liquid for the back face layer having the above composition so as to reach 1.0 g/m² in a dried state, and a back face layer was formed. Then, the other surface of the substrate was coated with a coating liquid for the dye primer layer having the following composition so as to reach 0.15 g/m² in a dried state, and a dye primer layer was formed. This dye primer layer was coated with coating liquids for yellow, magenta, and cyan dye layer having the above composition successively in a surface by surface manner so as to reach 0.7 g/m² in a dried state to form a yellow dye layer, a magenta dye layer, and a cyan dye layer, and a thermal transfer sheet (i) was obtained.

| <Coating liquid for the dye primer layer> | |
|---|---|
| Water-based urethane resin (solid content 26%) (Tg: −17° C.) (SUPERFLEX 650, DKS Co. Ltd.) | 5 parts |
| Water/isopropyl alcohol (1:1) mixed solvent | 95 parts |

| <Coating layer for yellow dye layer> | |
|---|---|
| Solvent yellow 93 | 5 parts |
| Polyvinyl acetoacetal resin (KS-5, SEKISUI CHEMICAL CO., LTD.) | 4 parts |
| Toluene | 50 parts |
| Methyl ethyl ketone | 50 parts |

| <Coating liquid for the magenta dye layer> | |
|---|---|
| Disperse Red 60 | 3 parts |
| Disperse Violet 26 | 3 parts |
| Polyvinyl acetoacetal resin (KS-5, SEKISUI CHEMICAL CO., LTD.) | 5 parts |
| Toluene | 50 parts |
| Methyl ethyl ketone | 50 parts |

| <Coating liquid for the cyan dye layer> | |
|---|---|
| Solvent blue 63 | 3 parts |
| Disperse Blue 354 | 2.5 parts |
| Polyvinyl acetoacetal resin (KS-5, SEKISUI CHEMICAL CO., LTD.) | 5 parts |
| Toluene | 50 parts |
| Methyl ethyl ketone | 50 parts |

(Releasability Evaluation)

By combining the transfer receiving article produced above with the thermal transfer sheet of each of Examples and Comparative Examples and using a printer described below, under 180/255 gray-scale image conditions, the transfer layer was transferred onto a portion of a region of the second receiving layer of the transfer receiving article (such that a portion of the surface of the second receiving layer is exposed), and the thermal transfer image-receiving sheet of each of Examples and Comparative Examples was obtained. Subsequently, using the following printer and the thermal transfer sheet (i) produced above, a magenta image was formed onto the first receiving layer of the thermal transfer image-receiving sheet of each of Examples and Comparative Examples obtained, under 255/255 gray-scale image conditions. During formation of this magenta image, the release force when the magenta dye layer of the thermal transfer sheet (i) was released from the first receiving layer was measured under the following conditions and evaluated based on the release force of Comparative Example 1, in comparison with that of other Examples and Comparative Example. Evaluation results are shown in Table 1.

(Printer)

Thermal head: KEE-57-12GAN2-STA (manufactured by KYOCERA Corporation

Heater average resistance: 3303 (Ω)

Main scanning direction printing density: 300 dpi

Sub scanning direction printing density: 300 dpi

Printing voltage: 18 (V)

One line cycle: 1.5 (msec.)

Printing start temperature: 35 (° C.)

Pulse-Duty ratio: 85%
(Measurement conditions for release force)
Release equipment: Surface Property Tester HEIDON-14 manufactured by Shinto Scientific Co., Ltd.
Release speed: 200 mm/minute
Width of specimen to be measured: 70 mm
Release angle: 180°
"Evaluation Criteria"
Δ: Reference value ±20%
○: Reference value −20 to −50%
: Reference value −50% or less
(Adhesion Evaluation)

By combining the transfer receiving article produced above with the thermal transfer sheet of each of Examples and using a printer described above, under 180/255 gray-scale image conditions, the transfer layer was transferred onto a portion of a region of the second receiving layer of the transfer receiving article (such that a portion of the surface of the second receiving layer is exposed), and the thermal transfer image-receiving sheet of each of Examples was obtained. Subsequently, using the above printer and the thermal transfer sheet (i) produced above, a gray image was formed by three-color printing in the order of yellow, magenta, and cyan onto the first receiving layer of the obtained thermal transfer image-receiving sheet of each of Examples under 127/255 gray-scale image conditions. Subsequently, mending tape was applied onto the gray image, and the status of the first receiving layer when the mending tape was peeled off was evaluated based on the following evaluation criteria. Evaluation results are shown in Table 1.
"Evaluation Criteria"
○: The first receiving layer does not peel off.
x: The first receiving layer peels off.
(Evaluation of Foil Tearing Property)

The transfer receiving article produced above was combined with the thermal transfer sheet of each of Examples. Using the above printer, under 180/255 gray-scale image conditions, the transfer layer was transferred onto a portion of a region on the second receiving layer of the transfer receiving article produced above so as to form a fine line, and the thermal transfer image-receiving sheet of each of Examples was obtained. Subsequently, the condition of the transfer layer of the obtained thermal transfer image-receiving sheet was visually observed, and the foil tearing property of the transfer layer was evaluated based on the following evaluation criteria. Evaluation results are shown in Table 1.
"Evaluation Criteria"
○: The 5-dot fine line is transferred and there is no collapse in the 5-dot-dropped fine line.
x: Tailing occurs around the 5-dot fine line. Alternatively, the 5-dot-dropped fine line is completely collapsed.

TABLE 1

| | Releasability | Adhesion | Foil tearing property |
|---|---|---|---|
| Example 1 | | ○ | ○ |
| Example 2 | | ○ | ○ |
| Example 3 | | ○ | ○ |
| Example 4 | ○ | ○ | ○ |
| Example 5 | | x | ○ |
| Example 6 | ○ | ○ | ○ |
| Example 7 | | ○ | x |
| Example 8 | | ○ | ○ |
| Example 9 | | ○ | ○ |
| Comparative Example 1 | Reference | — | ○ |
| Comparative Example 2 | Δ | — | ○ |

REFERENCE SIGNS LIST

100, 100A Thermal transfer sheet
1 Substrate
2 Receiving layer
3 Intermediate layer
4 Masking layer
10 Transfer layer
11 Dye primer layer
12 Dye layer
12Y Yellow dye layer
12M Magenta dye layer
12C Cyan dye layer
200 Thermal transfer image-receiving sheet
31 Substrate
32 Hologram layer
33 Second receiving layer
40 Pattern layer

The invention claimed is:
1. A thermal transfer image-receiving sheet comprising:
a pattern layer, a masking layer, an intermediate layer, and a receiving layer provided in this order on a substrate;
wherein a portion of the surface of the pattern layer is exposed,
wherein the receiving layer is a solvent-based receiving layer containing a solvent-based resin and a silicone oil,
wherein the intermediate layer is a water-based intermediate layer containing a water-based resin, and
wherein the masking layer is a solvent-based masking layer containing a solvent-based resin and a colorant.
2. The thermal transfer image-receiving sheet according to claim 1, wherein the glass-transition temperature (Tg) of the water-based resin contained in the water-based intermediate layer is 110° C. or less.

* * * * *